US008264703B2

(12) United States Patent
Isoda

(10) Patent No.: US 8,264,703 B2
(45) Date of Patent: Sep. 11, 2012

(54) INFORMATION PROCESSING METHOD AND APPARATUS THEREOF

(75) Inventor: Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1316 days.

(21) Appl. No.: 11/614,378

(22) Filed: Dec. 21, 2006

(65) Prior Publication Data

US 2007/0146768 A1 Jun. 28, 2007

(30) Foreign Application Priority Data

Dec. 27, 2005 (JP) .................. 2005-376671

(51) Int. Cl.
G06K 15/00 (2006.01)
G06F 3/12 (2006.01)
(52) U.S. Cl. .............. 358/1.14; 358/1.15; 358/1.18
(58) Field of Classification Search .......... 358/1.6, 358/1.9, 2.1, 3.24, 1.13, 1.14, 1.15, 1.16, 358/1.18, 3.28; 283/113; 713/176
See application file for complete search history.

(56) References Cited

U.S. PATENT DOCUMENTS

| 5,845,281 | A  | * | 12/1998 | Benson et al. ............. 1/1 |
| 6,307,640 | B1 | * | 10/2001 | Motegi ............. 358/1.14 |
| 6,452,692 | B1 | * | 9/2002  | Yacoub ............. 358/1.15 |
| 6,628,417 | B1 | * | 9/2003  | Naito et al. ............. 358/1.15 |
| 6,748,471 | B1 | * | 6/2004  | Keeney et al. ............. 710/220 |
| 6,938,154 | B1 | * | 8/2005  | Berson et al. ............. 713/156 |
| 6,965,958 | B1 | * | 11/2005 | Sugiyama ............. 710/104 |
| 6,970,259 | B1 | * | 11/2005 | Lunt et al. ............. 358/1.14 |
| 7,096,280 | B2 | * | 8/2006  | Aoki et al. ............. 709/246 |
| 7,110,541 | B1 | * | 9/2006  | Lunt et al. ............. 380/51 |
| 7,187,461 | B2 | * | 3/2007  | Schlonski et al. ............. 358/1.15 |
| 7,190,477 | B2 | * | 3/2007  | Ferlitsch ............. 358/1.15 |
| 7,213,060 | B2 | * | 5/2007  | Kemp et al ............. 709/222 |
| 7,382,487 | B2 | * | 6/2008  | Ikegami ............. 358/1.6 |
| 7,426,046 | B2 | * | 9/2008  | Shirai et al. ............. 358/1.13 |
| 7,464,335 | B2 | * | 12/2008 | Nakagiri et al. ............. 715/700 |
| 7,542,156 | B2 | * | 6/2009  | Sattler et al. ............. 358/1.14 |
| 7,609,412 | B2 | * | 10/2009 | Maruyama ............. 358/1.9 |
| 7,660,803 | B2 | * | 2/2010  | Jin ............. 715/741 |
| 7,664,956 | B2 | * | 2/2010  | Goodman ............. 713/176 |
| 7,676,750 | B2 | * | 3/2010  | Lindsey et al. ............. 715/743 |
| 7,716,490 | B2 | * | 5/2010  | Kanai ............. 713/182 |
| 7,768,662 | B2 | * | 8/2010  | Berndt et al. ............. 358/1.14 |
| 7,839,516 | B2 | * | 11/2010 | Tomita et al. ............. 358/1.15 |

(Continued)

FOREIGN PATENT DOCUMENTS

JP 05-150919 A 6/1993

(Continued)

Primary Examiner — Twyler Haskins
Assistant Examiner — Jonathan Beckley
(74) Attorney, Agent, or Firm — Cowan, Liebowitz & Latman, P.C.

(57) ABSTRACT

An access rights control system can set permission/inhibition of print processing for respective users and files, but it cannot set permission/inhibition of print processing for respective printer devices. Hence, a first identifier required to identify a printer device is obtained from data, a second identifier required to identify an available printer device is obtained from a memory, and a printer device which is permitted to print the data is determined based on the relationship between the first identifier and the second identifier.

6 Claims, 19 Drawing Sheets

U.S. PATENT DOCUMENTS

| | | | |
|---|---|---|---|
| 2002/0097431 A1* | 7/2002 | Ikegami | 358/1.15 |
| 2002/0196451 A1* | 12/2002 | Schlonski et al. | 358/1.1 |
| 2003/0053105 A1* | 3/2003 | Morooka et al. | 358/1.13 |
| 2003/0076526 A1* | 4/2003 | Gopalan | 358/1.15 |
| 2005/0021980 A1* | 1/2005 | Kanai | 713/182 |
| 2005/0168766 A1* | 8/2005 | Troyansky et al. | 358/1.14 |
| 2007/0091360 A1* | 4/2007 | Iizuka | 358/1.15 |

FOREIGN PATENT DOCUMENTS

| | | | |
|---|---|---|---|
| JP | 2004-152261 | | 5/2004 |
| JP | 2005-202553 A | | 7/2005 |
| JP | 2007122215 A | * | 5/2007 |
| WO | 01/33367 A | | 5/2001 |

* cited by examiner

FIG. 8

THIS FILE IS PRINT-INHIBITED

FIG. 9

| SELECT PRINTER | PRINT PERMISSION/INHIBITION FOR CORRESPONDING FILE |
|---|---|
| PRINTER A | PRINT PERMITTED |
| PRINTER B | PRINT INHIBITED |
| PRINTER C | PRINT INHIBITED |
| PRINTER D | PRINT PERMITTED |

FIG. 10

```
THIS FILE IS PRINT-INHIBITED
FOR SELECTED PRINTER
```

FIG. 13

| DOCUMENT IDENTIFIER | PERMITTED PRINTER IDENTIFIER |
|---|---|
| 00103 | 1234, 5678 |
| 01002 | 5678, WXYZ |
| 0A245 | |
| AVDFR | 1234, 5678, WXYZ |

INFORMATION PROCESSING METHOD AND APPARATUS THEREOF

BACKGROUND OF THE INVENTION

1. Field of the Invention

The present invention relates to information processing for controlling the access rights of digital data.

2. Description of the Related Art

In recent years, an access rights management server which can control access (browse, valid period, copy, print, modification, and the like) to various files is on the market. An author of files can control access rights to a distribution file by each individual user using the access rights management server.

As an example of the access rights management server which has already been released, Adobe® Policy Server is known. The Policy Server can attain the aforementioned access rights control to PDF (Portable Document Format) files. Also, Information Rights Management (IRM) announced by Microsoft® allows the aforementioned access rights control.

However, the access rights control system can set permission/inhibition of print for respective users and files, but it cannot set permission/inhibition of print for respective printer devices. If a wrong printer device is designated, upon printing a file including confidential information, a person who does not have any access rights to that information may see the printouts, and the confidential information may leak.

SUMMARY OF THE INVENTION

The first aspect of the present invention discloses an information processing method comprising the steps of:

obtaining a first identifier required to identify a printer device from data;

obtaining a second identifier required to identify an available printer device from a memory; and determining a printer device which is permitted to print the data based on a relationship between the first identifier and the second identifier.

The second aspect of the present invention discloses an information processing method comprising the steps of:

obtaining a data identifier required to identify data from the data;

obtaining a first identifier required to identify a printer device associated with the data identifier from a server;

obtaining a second identifier required to identify an available printer device from a memory; and determining a printer device which is permitted to print the data based on a relationship between the first identifier and the second identifier.

According to the present invention, permission/inhibition of print of each file can be set for respective printer devices.

Further features of the present invention will become apparent from the following description of exemplary embodiments with reference to the attached drawings.

BRIEF DESCRIPTION OF THE DRAWINGS

FIG. 8 shows an example of a print inhibition message;

FIG. 9 is a table showing an example of a list of available printer devices and permission/inhibition of print;

FIG. 10 shows an example of a message displayed upon selection of a print-inhibited printer device;

FIG. 13 shows a print-permitted printer management table which is held by an access rights management server, and indicates the correspondence between document identifiers and print-permitted printer identifiers;

DESCRIPTION OF THE EMBODIMENTS

Information processing according to preferred embodiments of the present invention will be described in detail hereinafter with reference to the accompanying drawings.

First Embodiment

[Arrangements of System and Apparatus]

Figure 1:
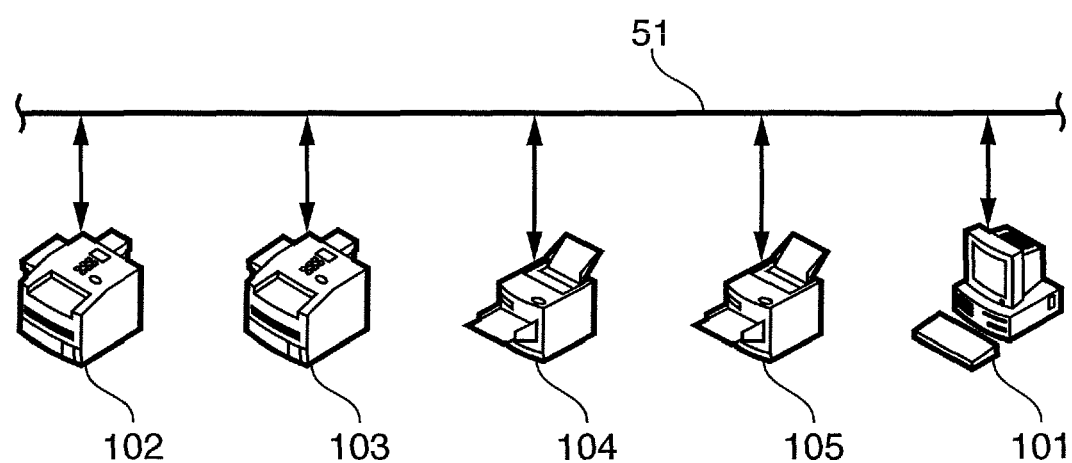
FIG. 1 is a diagram showing the arrangement of an information processing system of the first embodiment.

FIG. 1 shows the arrangement of an information processing system of the first embodiment. A plurality of printer devices 102 to 105 and an information processing apparatus 101 are connected to a network 51 such as a local area network (LAN) or the like. Note that FIG. 1 illustrates only one information processing apparatus but a plurality of information processing apparatuses can be connected, needless to say. The models of a plurality of printer devices connected to the network 51 are not particularly limited, and an identical model or different models of printer devices may be connected.

Figure 2:
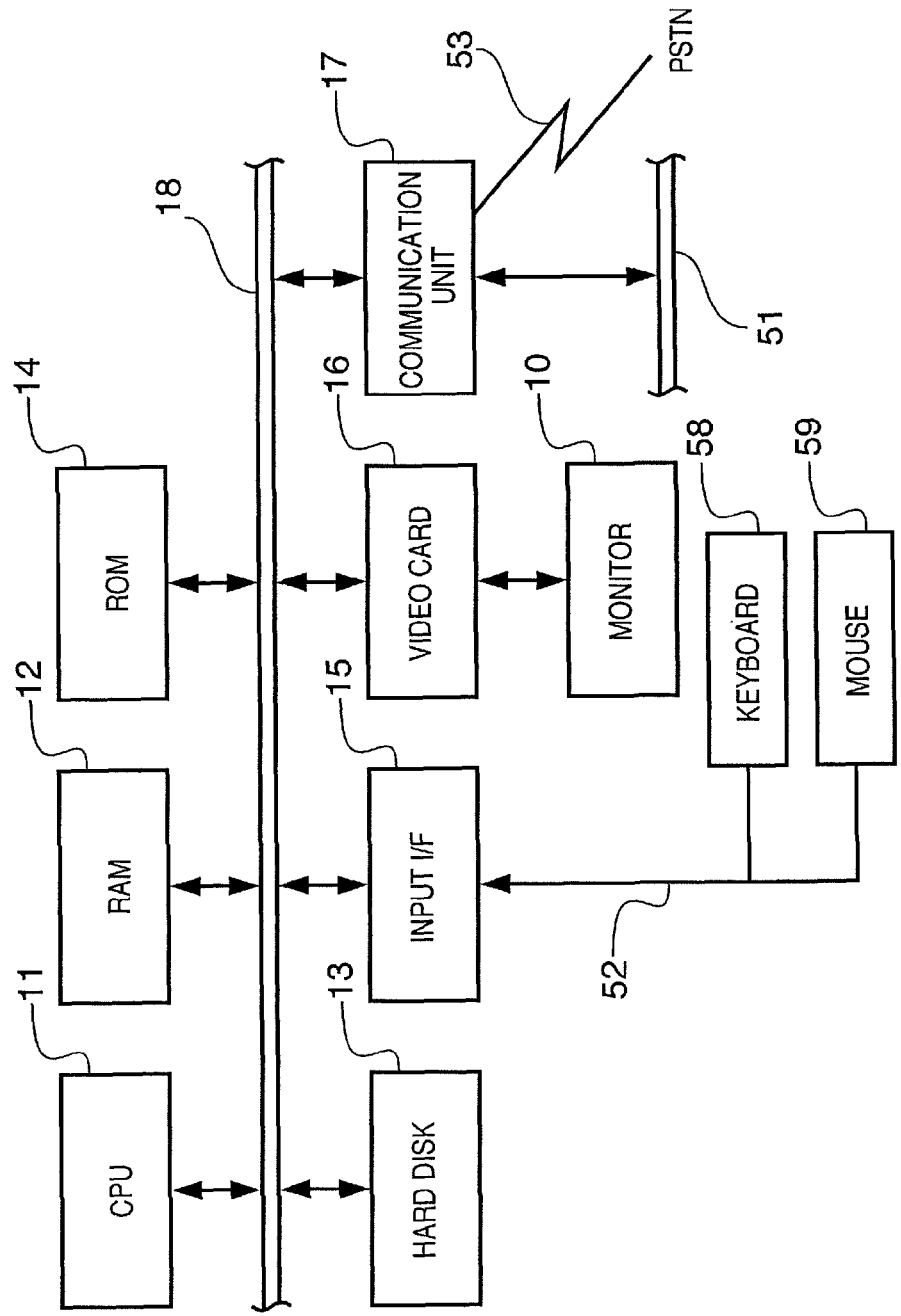
FIG. 2 is a block diagram showing the arrangement of an information processing apparatus.

FIG. 2 is a block diagram showing the arrangement of the information processing apparatus 101.

A CPU 11 executes an operating system (OS) and various programs stored in a hard disk drive (HD) 13 and a ROM 14 using a RAM 12 as a work area, and controls respective components to be described below via a system bus 18.

An input interface (I/F) 15 is an interface with a serial bus 52 such as IEEE1394, USB (Universal Serial Bus), or the like, which connects input devices such as a keyboard 58, mouse 59, and the like. A video card 16 connects a monitor 10 such as an LCD or the like. A communication unit 17 is an interface with a public switched telephone network (PSTN) 53 and the network 51.

The CPU 11 displays a user interface on the monitor 10. The user inputs commands and data to the CPU 11 by operating the keyboard 58 and mouse 59 based on the user interface. The CPU 11 makes facsimile (FAX) communications and communications with information devices connected to the network 51 via the communication unit 17.

Figure 3:
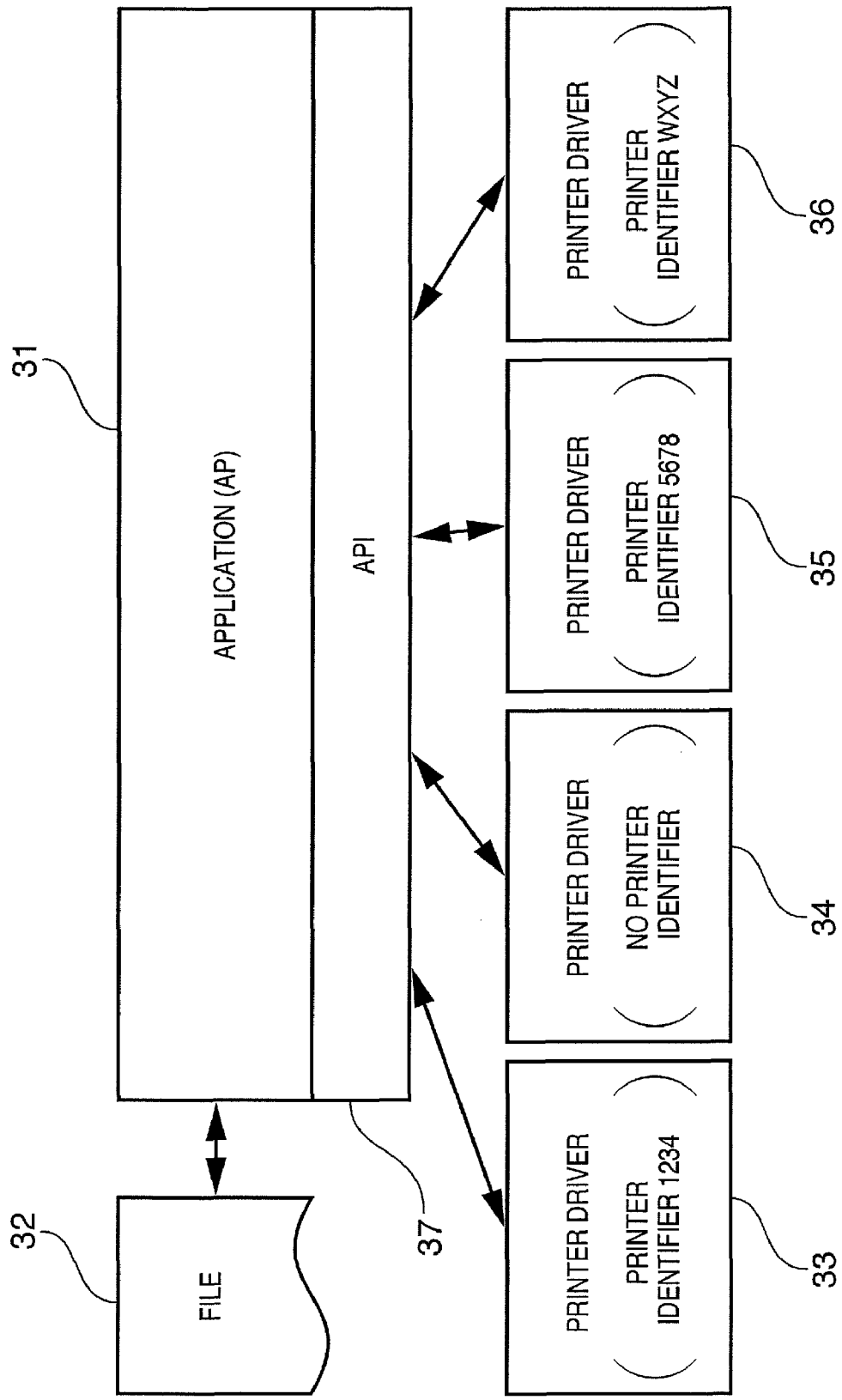
FIG. 3 is a diagram showing the configuration of software to be executed by a CPU.

FIG. 3 shows the configuration of the software to be executed by the CPU 11. The HD 13 stores such software to be executed by the CPU 11.

An application (AP) 31 such as application software such as a wordprocessor, spreadsheet, presentation, or the like, a PDF viewer, a browser, or the like accesses a file 32 to open it. The AP 31 communicates with printer drivers 33 to 36 installed in the information processing apparatus 101 via an API (Application Program Interface) 37. The file 32 may be stored in the HD 13 of the information processing apparatus 101 or may be stored in a server (not shown) on the network 51.

Figure 4:
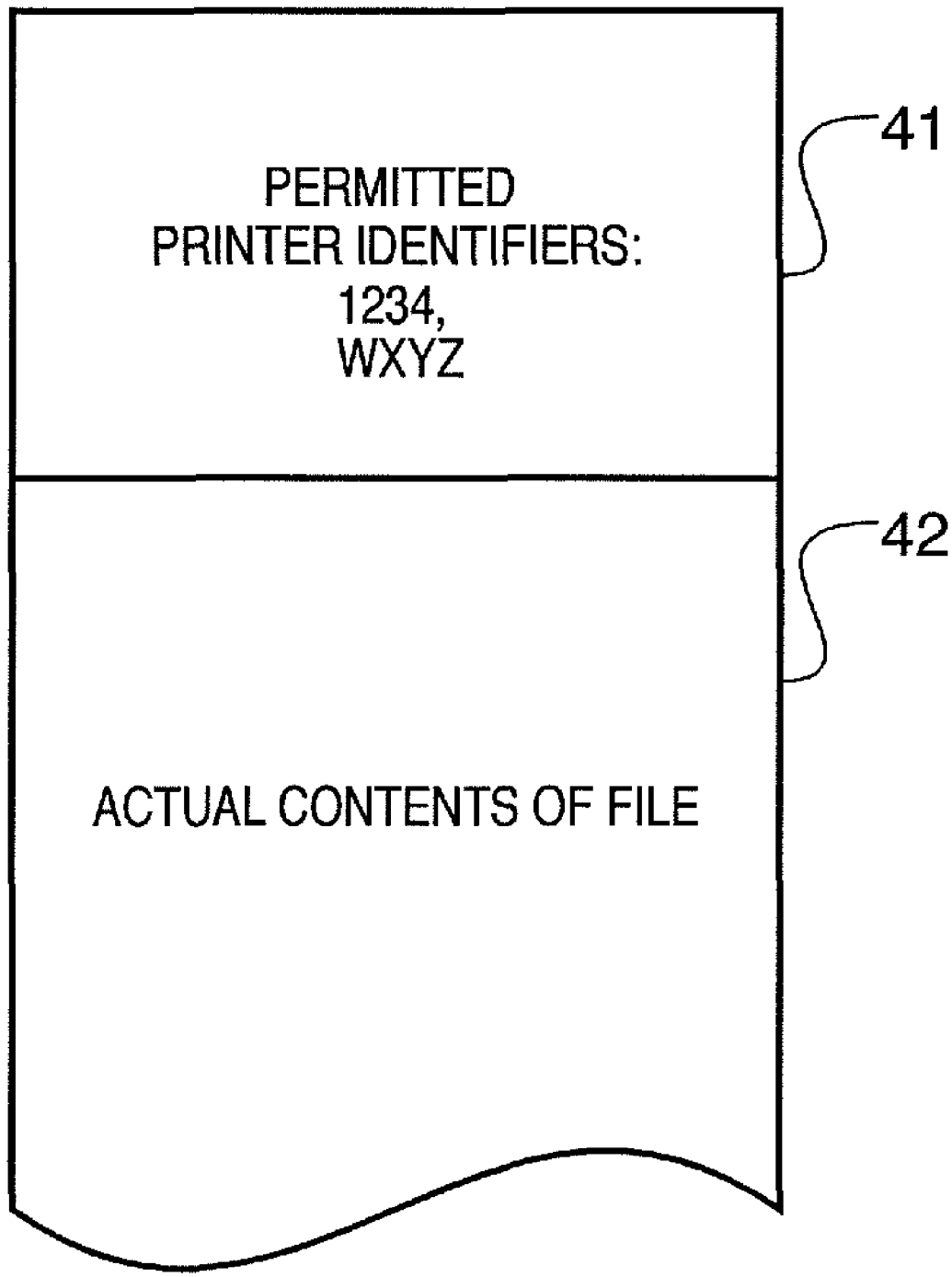
FIG. 4 shows a format example of a file.

FIG. 4 shows a format example of the file 32. A permitted printer identifier recorded in, e.g., a header 41 of the file is information which is embedded in the file 32 by the author of the file 32 and indicates a printer device which is permitted to print this file. Note that the permitted printer identifier may be recorded in a footer after actual contents 42 of the file, or may be embedded in the actual contents 42 of the file using a digital watermark technique.

Figure 5:
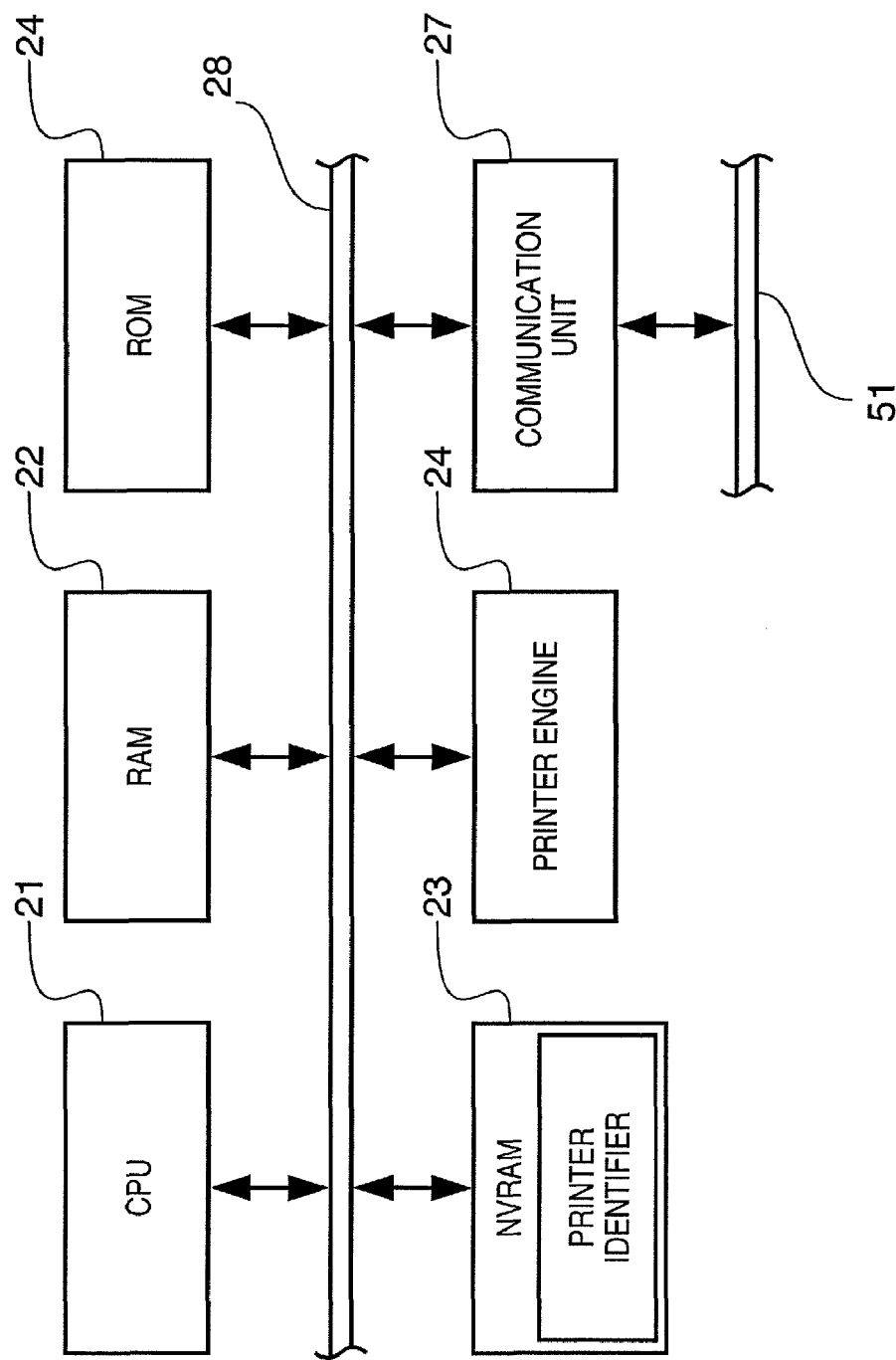
FIG. 5 is a block diagram showing the arrangement of a printer device.

FIG. 5 is a block diagram showing the arrangement of each of the printer devices 102 to 105.

A CPU 21 executes an operating system (OS) and programs associated with print processing, which are stored in a ROM 24 or a rewritable nonvolatile memory (NVRAM) 23 such as a hard disk or the like. The CPU 21 controls respective components to be described below via a system bus 28. Note that the NVRAM 23 stores a printer identifier used to identify an individual piece of a printer.

The CPU 21 receives a print job from the information processing apparatus 101 via a communication unit 27. The CPU 21 executes image processing (interpretation of printer description language data and rendering) in accordance with the received print job. The CPU 21 sends print data as the rendering result to a printer engine 24 to execute print processing. Note that the communication unit 27 is an interface with the network 51 and serial bus 52.

[Obtain Printer Identifier]

Figure 6:
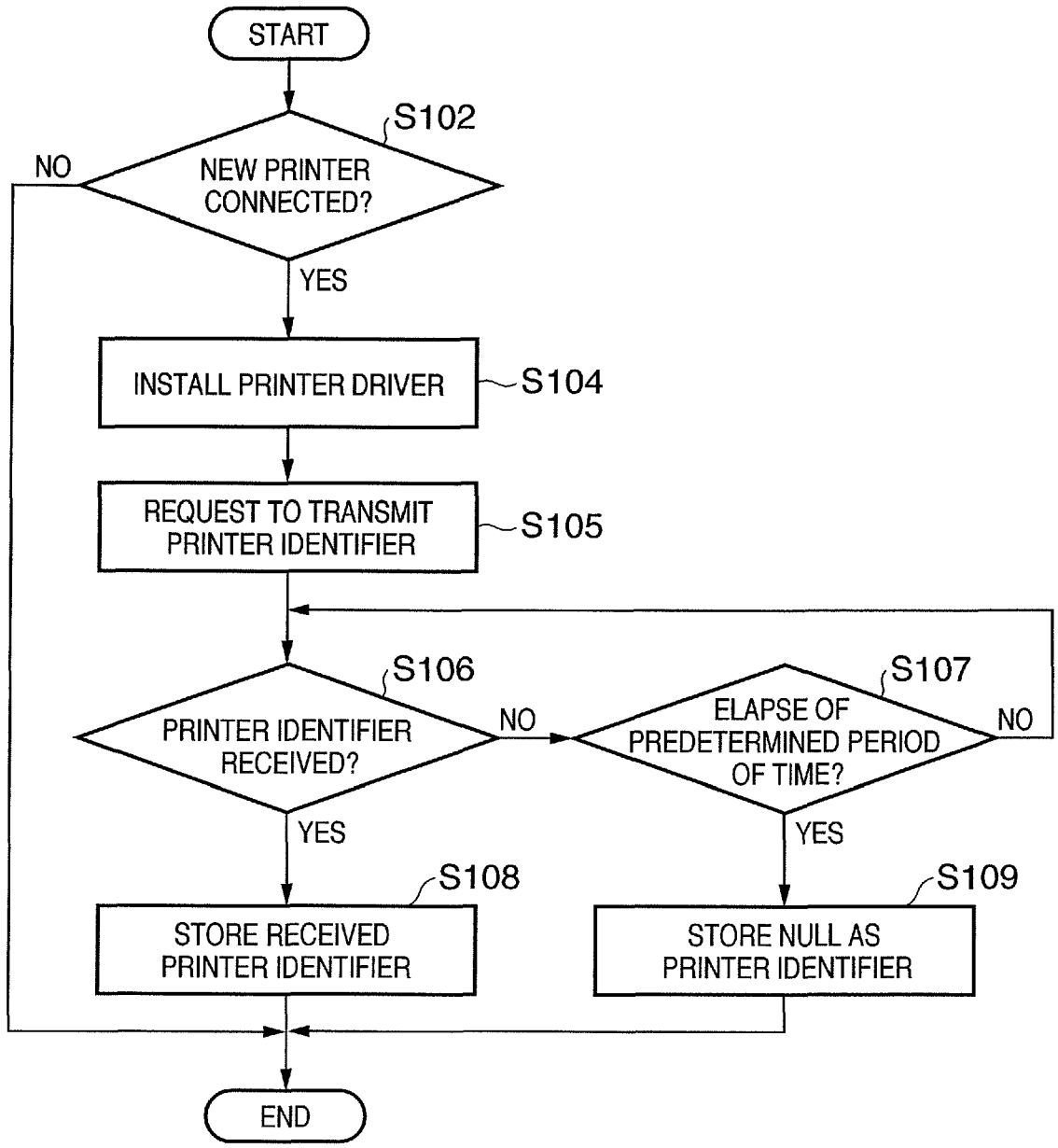
FIG. 6 is a flowchart for explaining the operation for installing a printer driver in the information processing apparatus.

FIG. 6 is a flowchart for explaining the operation for installing a printer driver in the information processing apparatus 101. The CPU 11 executes this processing upon activating the information processing apparatus 101.

The CPU 11 checks if a new printer device is connected to the network 51 or serial bus 52 (S102). Note that various methods of detecting connection of a new printer device are available, and any of such methods may be adopted. If a new printer device is not connected, the installation operation ends.

If a new printer device is connected, the CPU 11 installs a printer driver corresponding to that printer device (S104). Note that various methods of installing a printer driver are available, and any of such methods may be adopted. Next, the CPU 11 requests the newly connected printer device to transmit a printer identifier via the installed printer driver (S105).

Upon reception of the transmission request of the printer identifier, the printer device returns its printer identifier if the NVRAM 23 holds the printer identifier. If the NVRAM 23 does not hold any printer identifier, the printer device ignores that transmission request.

The CPU 11 waits for reception of the printer identifier (S106). If the CPU 11 does not receive any printer identifier after an elapse of a predetermined period of time (S107), it determines that the newly connected printer device does not hold any printer identifier. The CPU 11 stores "NULL" in a storage area of the HD 13 that stores the printer identifier of the printer device of interest (S109), thus ending the installation operation. If the CPU 11 receives the printer identifier, it stores the received printer identifier in that storage area (S108), thus ending the installation operation.

[Print Operation]

Figure 7:
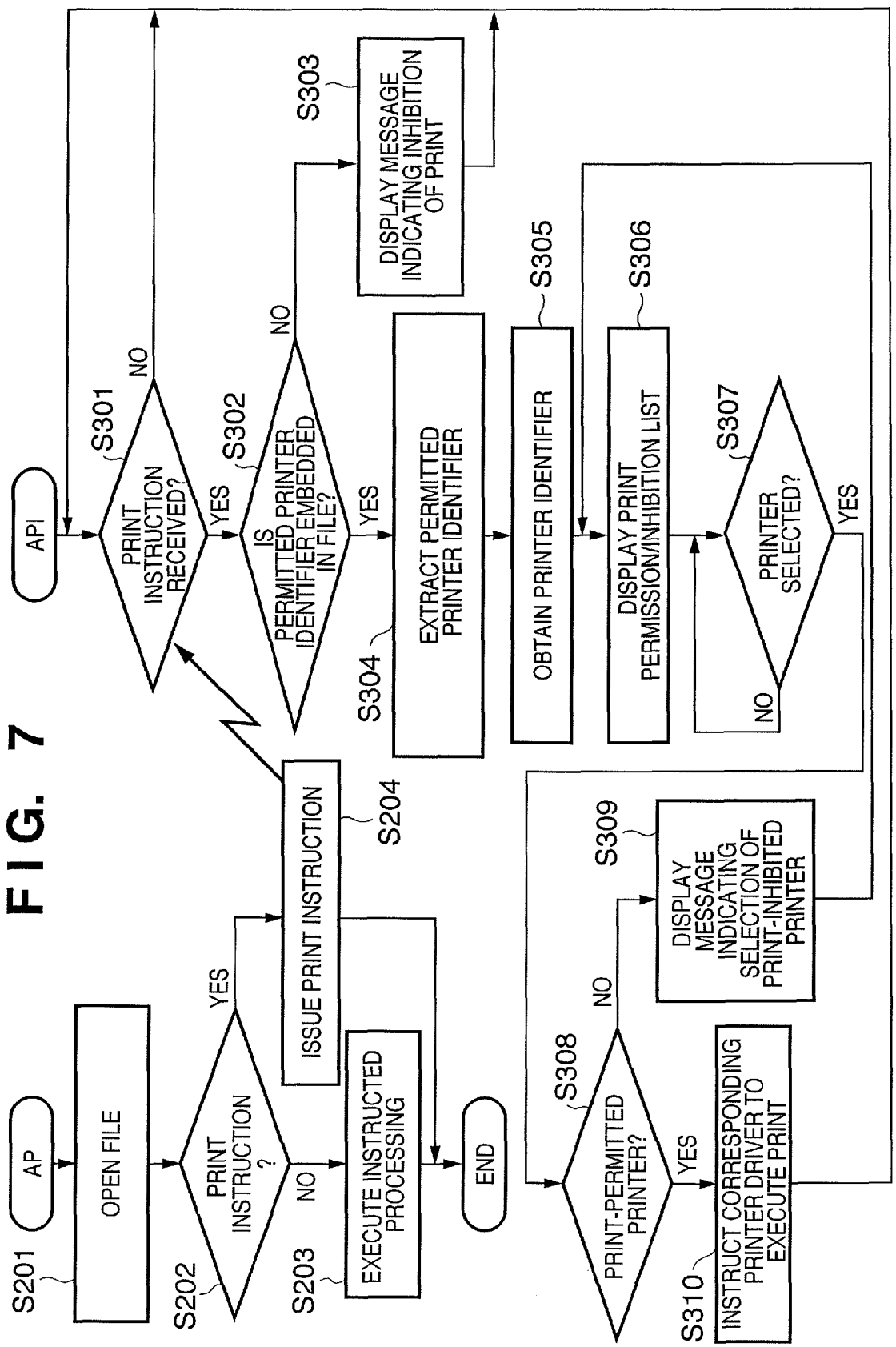
FIG. 7 is a flowchart for explaining the print operations of an AP and API.

FIG. 7 is a flowchart for explaining the print operation of the AP 31 and API 37. A case will be described below wherein a user who has an authority to open, browse, and print the file 32 opens this file 32 and inputs a print instruction.

The AP 31 opens the file 32 designated by the user (S201), and checks if the user issues a print instruction (S202). If the user instructs to execute processing other than print processing such as movement, enlarge/reduction display, edit (if it is permitted), and the like of pages, the AP 31 executes the instructed processing (S203), and terminates the process. If the user instructs to print the file 32 (or its part), the AP 31 issues a print instruction to the API 37 (S204), and terminates the process.

Figure 8:
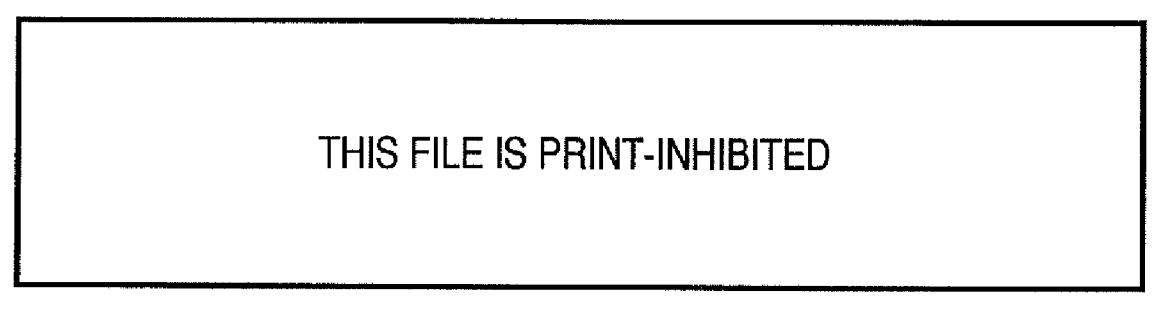

Upon reception of the print instruction (S301), the API 37 checks if a permitted printer identifier is embedded in the file 32 (S302). If a permitted printer identifier is not embedded, the API 37 determines that the print processing of the file 32 is not permitted, and displays a message indicating that print processing is inhibited (FIG. 8) on the monitor 10 (S303). Then, the process returns to step S301 without executing print processing.

If the permitted printer identifier is embedded, the API 37 extracts the permitted printer identifier from the file 32 (S304), and obtains the printer identifier corresponding to the printer driver already installed in the information processing apparatus 101 from the HD 13 (S305). Then, the API 37 displays, on the monitor 10, a list (FIG. 9) indicating the relationship between available printer devices and permission/inhibition of print processing based on the relationship between the permitted printer identifier and the printer identifier (S306). That is, the API 37 presents to the user printer devices that can print the file and prompts the user to select a printer device. Note that the API 37 permits print processing using a printer device whose printer identifier matches the permitted printer identifier, and inhibits print processing using a printer device whose printer identifier does not match the permitted printer identifier. If the permitted printer identifier is "NULL", the API 37 inhibits print processing using all the printer devices.

If the user selects a printer device (S307), the API 37 checks if the user selects a print-permitted printer device (S308). If the user selects a print-inhibited printer device, the API 37 displays a message shown in FIG. 10 (S309), and the process returns to step S306.

If the user selects the print-permitted printer device, the API 37 passes data (or its part) of the file 32 to the printer driver corresponding to the printer device of interest, and requests it to prepare print data (S310). The process then returns to step S301.

In response to the request from the API 37, the printer driver prepares print data, and transmits a print job including that print data to the target printer device, thus making that printer device execute print processing.

In this manner, a printer device other than that which has a printer identifier designated by the author of the file upon preparing or editing the file cannot print that file. In other words, if the author of the file inhibits print processing using a printer device which may cause information leakage, the user who opened that file cannot designate the printer device which may cause information leakage for print processing. Therefore, leakage of confidential information when a user who has no access rights to information of the file sees the printouts can be prevented.

Print processing of files which can only be accessed in only a specific room (information clean room) is limited to a printer device equipped in that room. However, the user cannot perform print processing if such printer device undergoes maintenance or suffers trouble or the like. In such case, a system administrator rewrites the printer identifier held by that printer device. If a plurality of printer identifiers are registered, printer devices outside the specific room can be used on a temporary basis to execute print processing. Alternatively, the user who has an authority to change the file such as a security administrator, the author of the file, or the like may update the permitted printer identifier (e.g., he or she may rewrite the permitted printer identifier embedded in the file, may add another permitted printer identifier, and so forth) in step S203. In this way, the user can use a printer device outside the specific room on a temporary basis.

Second Embodiment

Information processing according to the second embodiment of the present invention will be described below. Note that the same reference numerals in the second embodiment denote the same parts as in the first embodiment, and a detailed description thereof will be omitted.

[System Arrangement]

Figure 11:
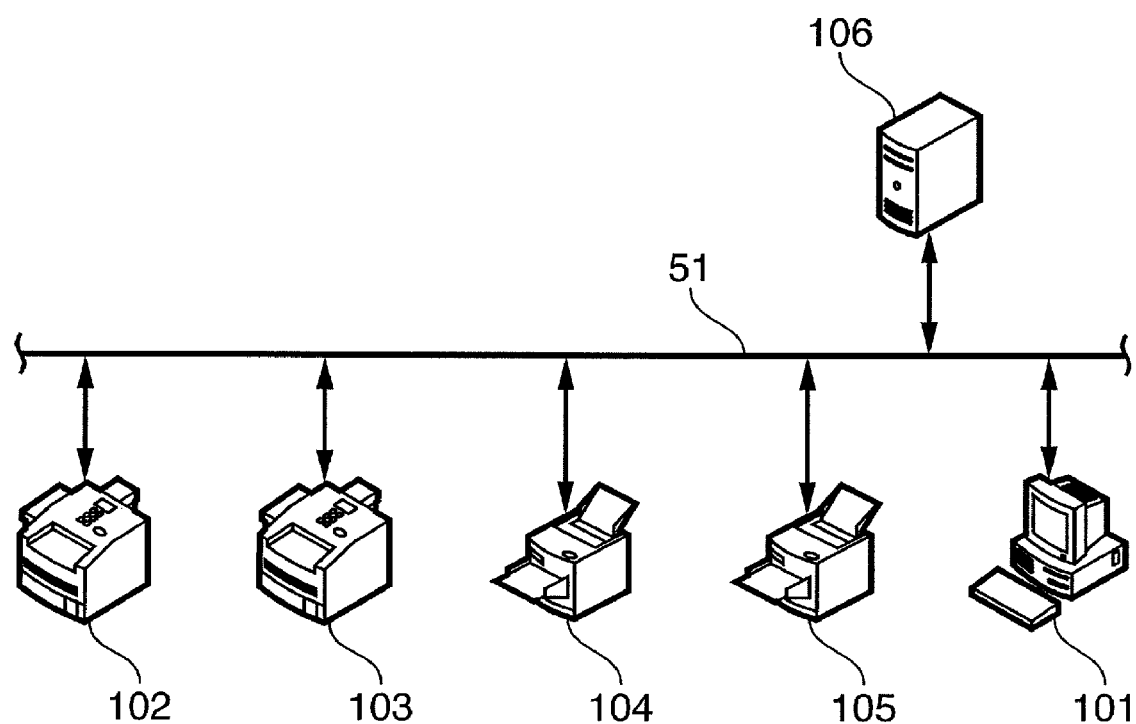
FIG. 11 is a diagram showing the arrangement of an information processing system of the second embodiment.

FIG. 11 shows the arrangement of an information processing system of the second embodiment. An access rights management server 106 is connected to the network 51 in addition to the plurality of printer devices 102 to 105 and information processing apparatus 101 shown in FIG. 1. A case will be exemplified below wherein the information processing apparatus 101 communicates with the access rights management server 106 in the information processing system shown in FIG. 11, and when print processing of the file corresponding to a print instruction is permitted, print processing is executed. Note that the arrangement of the access rights management server 106 is substantially the same as that of the information processing apparatus 101 shown in FIG. 2. Therefore, the processing of the access rights management server 106 (to be described later) is implemented when the CPU 11 executes a program stored in the HD 13.

Figure 12:
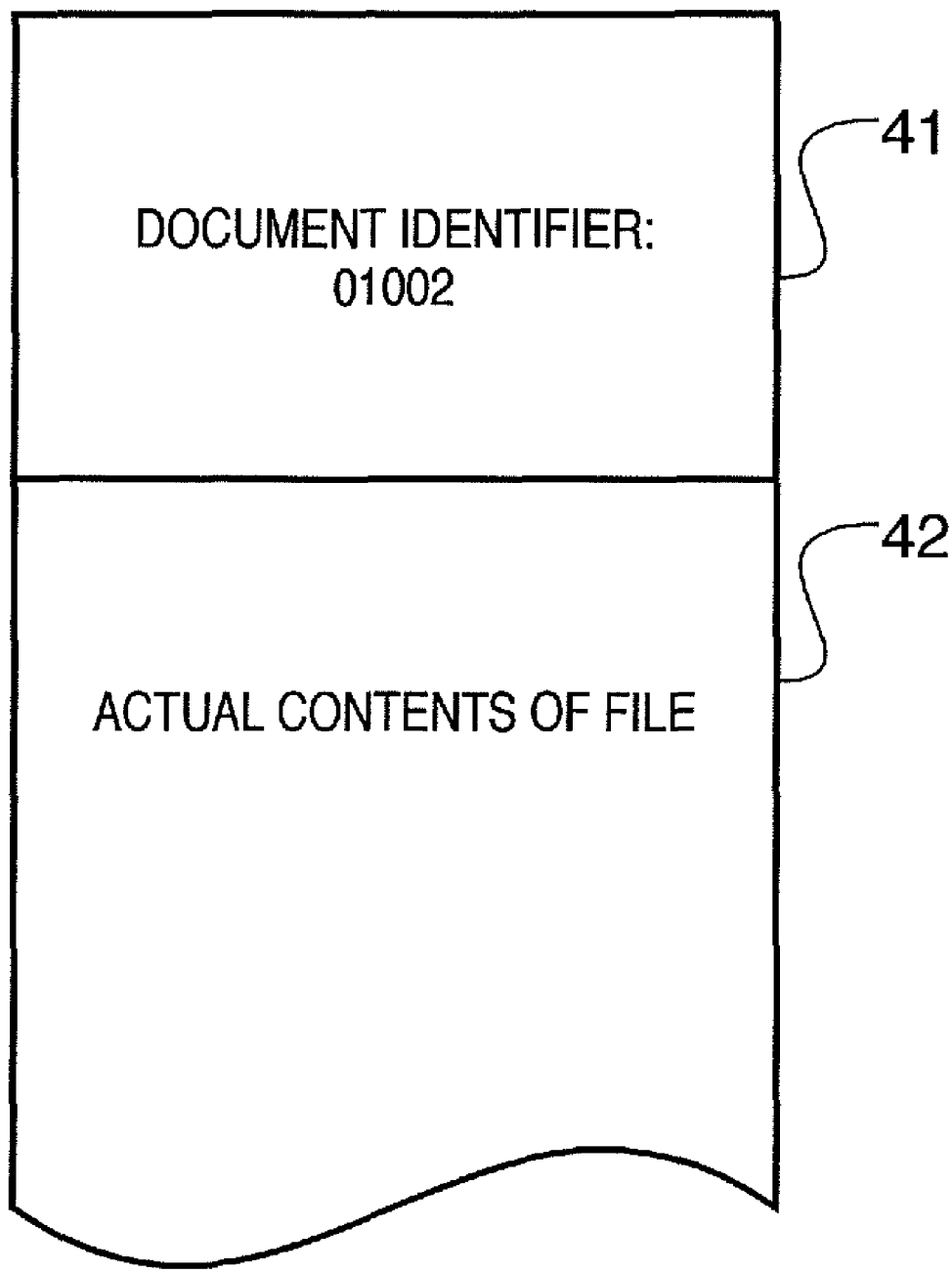
FIG. 12 shows a format example of a file.

FIG. 12 shows a format example of the file 32. A document identifier, which is recorded in, e.g., a header 41 of the file is a unique ID required to identify the file 32, which ID is assigned from, e.g., the access rights management server 106 upon preparation of the file 32.

FIG. 13 shows a permitted printer management table showing the correspondence between the document identifiers and permitted printer identifiers, which table is held by the access rights management server 106. A permitted printer identifier field of the permitted printer management table can register a plurality of printer identifiers. Note that a comma in FIG. 13 is a delimiter. The permitted printer management table is stored in the RAM 12 or HD 13 of the access rights management server 106.

[Access Rights Management Server]

Figure 14A:
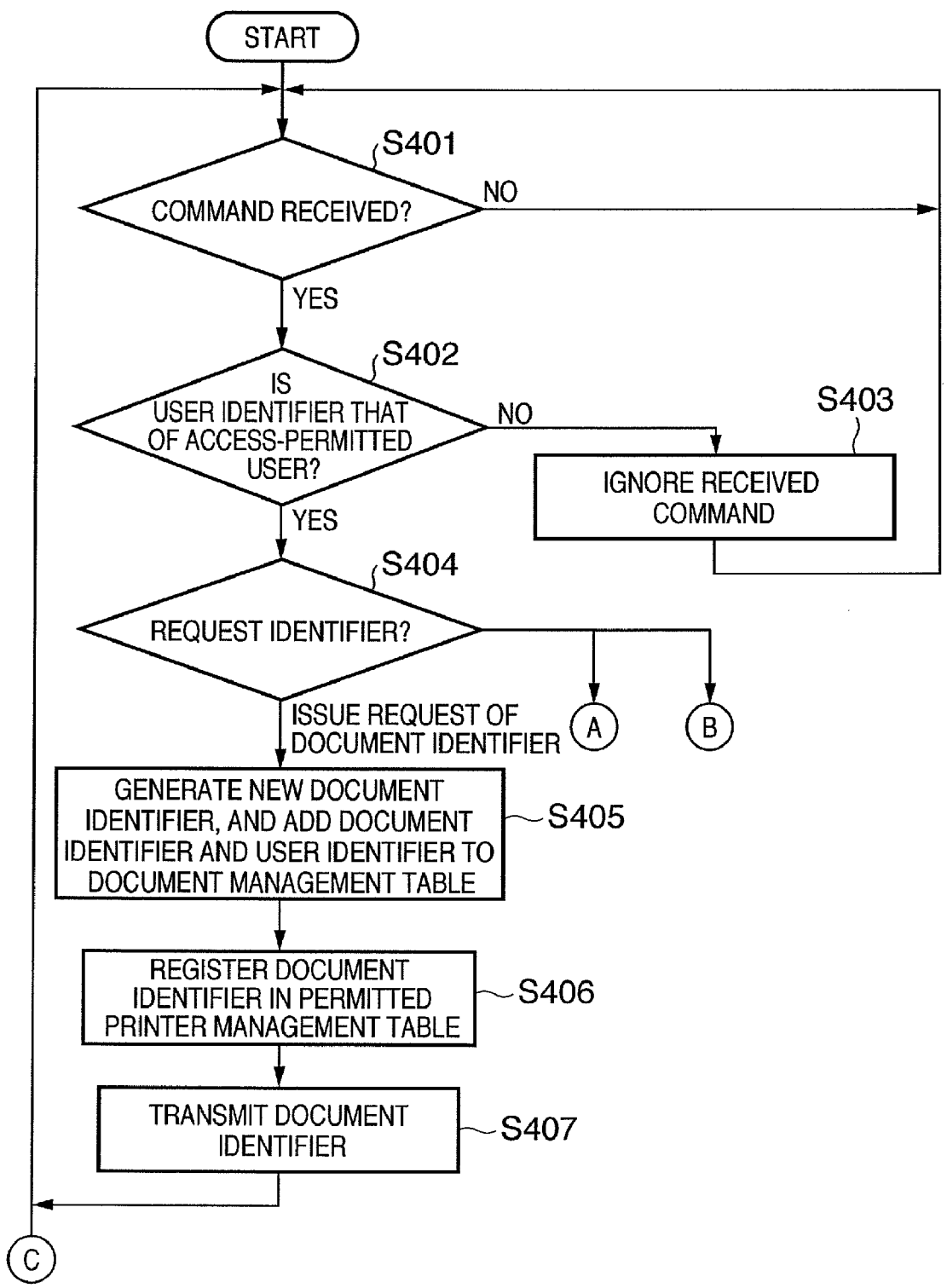
FIGS. 14A to 14C are flowcharts showing the operation of the access rights management server.
Figure 14B:
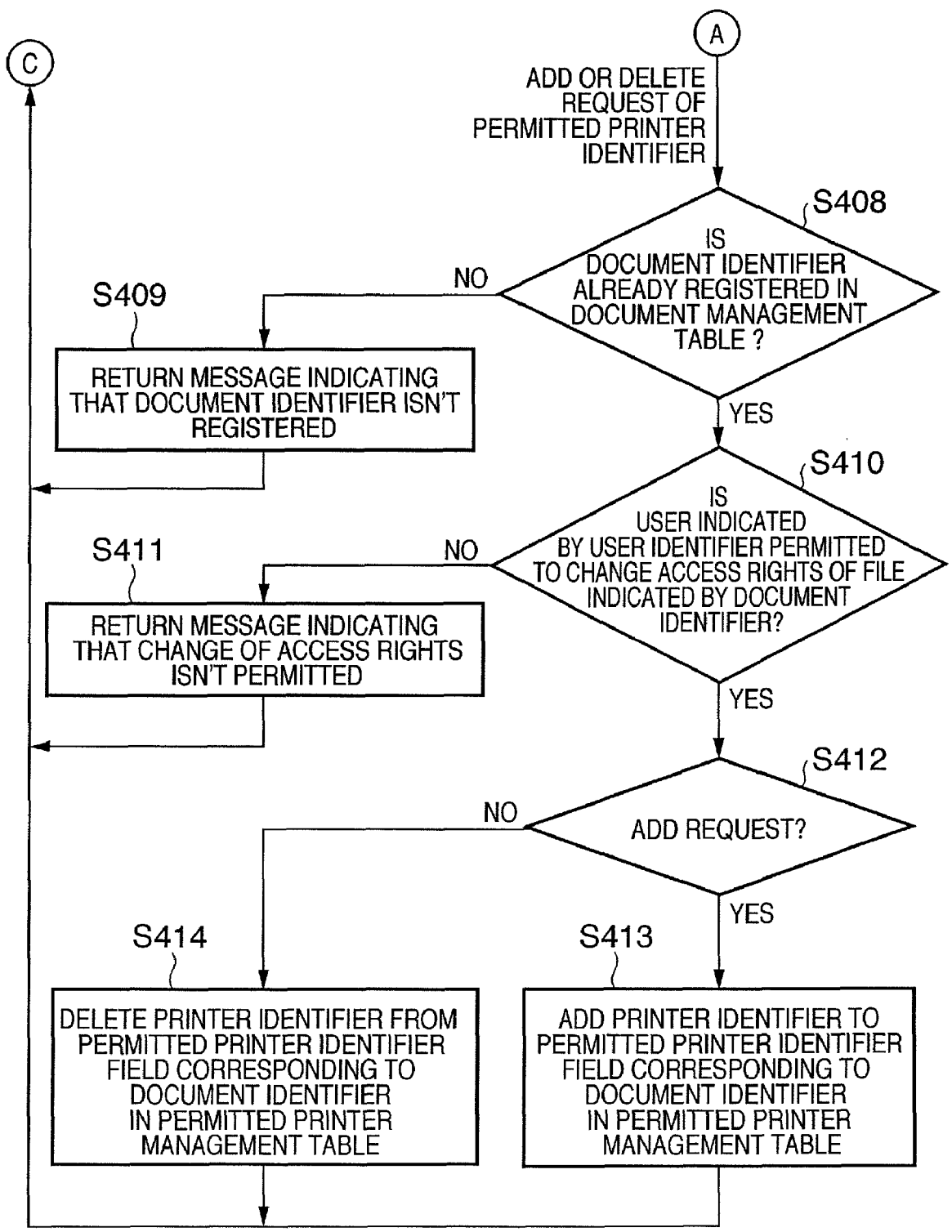
Figure 14C:
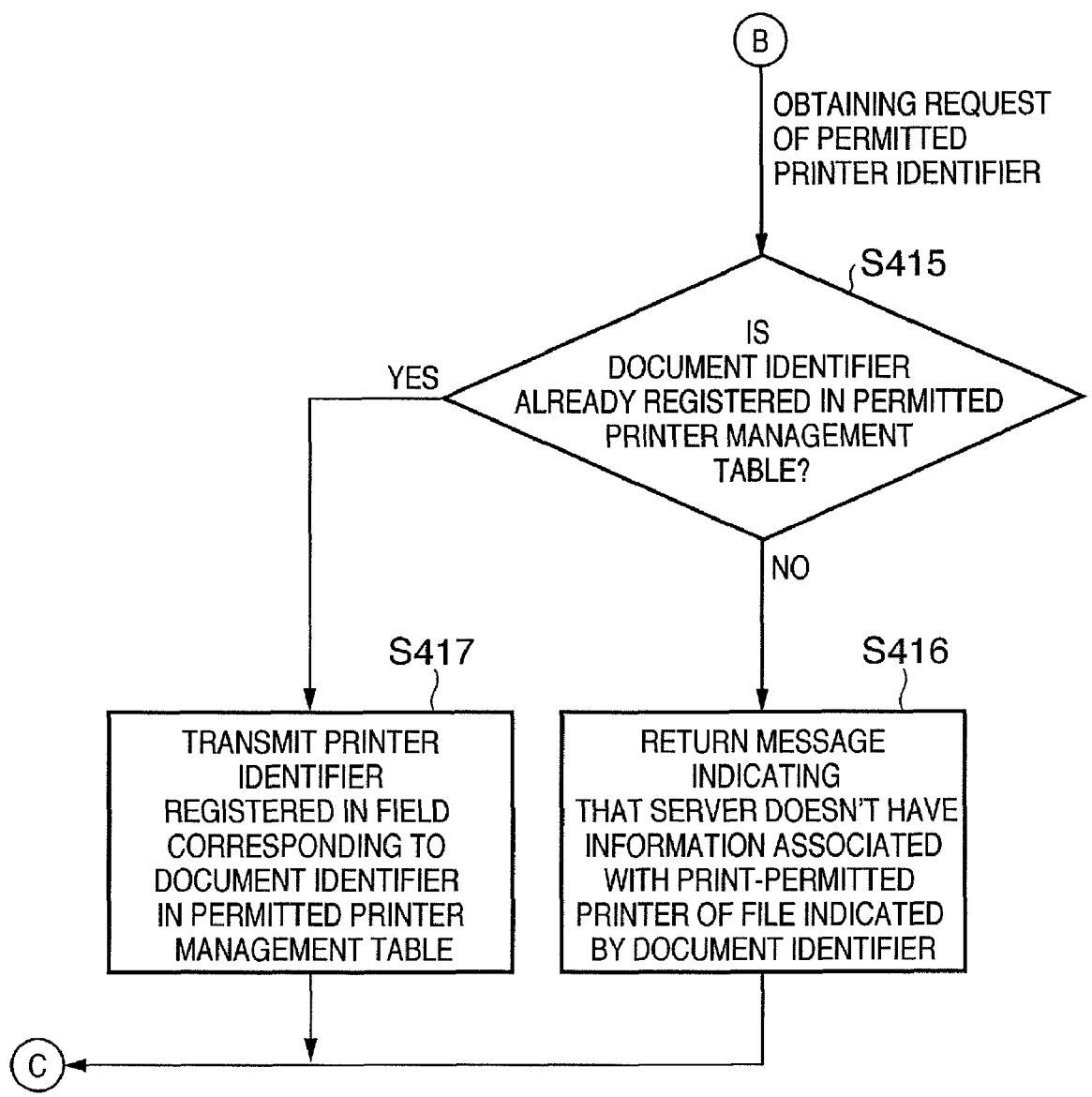

FIGS. 14A to 14C are flowcharts for explaining the operation of the access rights management server 106.

The access rights management server 106 waits for reception of a command (S401). A client (information processing apparatus 101) of the access rights management server 106 can pass commands to the access rights management server 106 by various methods. For example, the access rights management server 106 provides a Web page to the client, and the user of the client can input commands using a window (user interface) displayed on the monitor via a Web browser.

Figure 15:
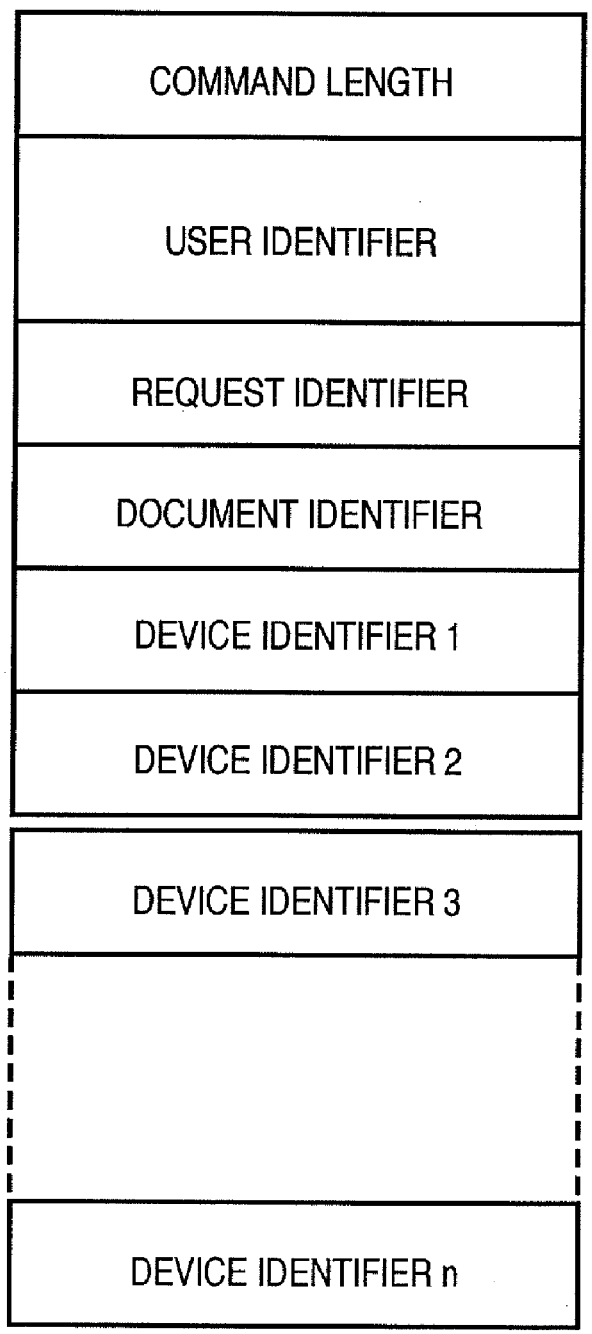
FIG. 15 shows the format of a command.

FIG. 15 shows the format of a command. A "command length" indicates the length of each command. A "user identifier" is an identifier of the user of the client, who issued a command. A "request identifier" is set with an issue request of a document identifier, an add or delete request of a permitted printer identifier, an obtaining request of a permitted printer identifier corresponding to the document identifier, or the like in accordance with the user request. A document identifier is an identifier required to specify a file to be processed. A device identifier is a field used to set an identifier of a device. In this embodiment, one or a plurality of printer identifiers are set upon requesting to add or delete a permitted printer identifier.

Upon receiving a command, the access rights management server 106 refers to a user management table stored in the RAM 12 or HD 13. The server 106 checks if the user identifier of the received command is that of a user who is permitted to access the access rights management server 106 (S402). If the user identifier of the received command is not that of the permitted user, the server 106 ignores the received command (S403); otherwise, it checks a request identifier (S404).

If the request identifier includes an issue request of a document identifier, the access rights management server 106 generates a new document identifier. The server 106 adds the document identifier and user identifier to a document management table stored in the RAM 12 or HD 13 (S405), and registers the document identifier in the permitted printer management table (S406). Then, the server 106 transmits the document identifier to the client (S407).

If the request identifier includes an add or delete request of a permitted printer identifier, the access rights management server 106 checks if the document identifier is registered in the document management table (S408). If the document identifier is not registered, the server 106 returns a message that advices accordingly to the client (S409), and does not process the request. If the document identifier is registered, the server 106 checks if the user indicated by the user identifier is permitted to change the access rights of a file with that document identifier (S410). If the user is not permitted to change the access rights, the server 106 returns a message that advices accordingly to the client (S411), and does not process the request. If the user is permitted to change the access rights, the server 106 checks if the request is an add or delete request of a permitted printer identifier (S412).

If the request is an add request, the access rights management server 106 adds (or registers) a printer identifier designated in a device identifier field of the command to a permitted printer identifier field corresponding to the document identifier in the permitted printer management table (S413). Note that one or a plurality of device identifier fields can be set, and if the command includes a plurality of device identifier fields, the server 106 adds (registers) printer identifiers designated in these fields together.

If the request is a delete request, the access rights management server 106 deletes a printer identifier designated in a device identifier field of the command from the permitted printer identifier field corresponding to the document identifier in the permitted printer management table (S414). If the command includes a plurality of device identifier fields, the server 106 deletes printer identifiers designated in these field together.

If the request identifier includes an obtaining request of a permitted printer identifier, the access rights management server 106 checks if the document identifier is registered in the permitted printer management table (S415). If the document identifier is not registered, the server 106 returns "NULL" to the client to indicate that it does not have any information associated with a print-permitted printer of the document identifier of interest (S416). If the document identifier is registered, the server 106 transmits a printer identifier registered in the field corresponding to the document identifier in the permitted printer management table to the client (S417). If the permitted printer identifier field corresponding to the document identifier is empty, the server 106 also returns "NULL".

[Client]

Figure 16:
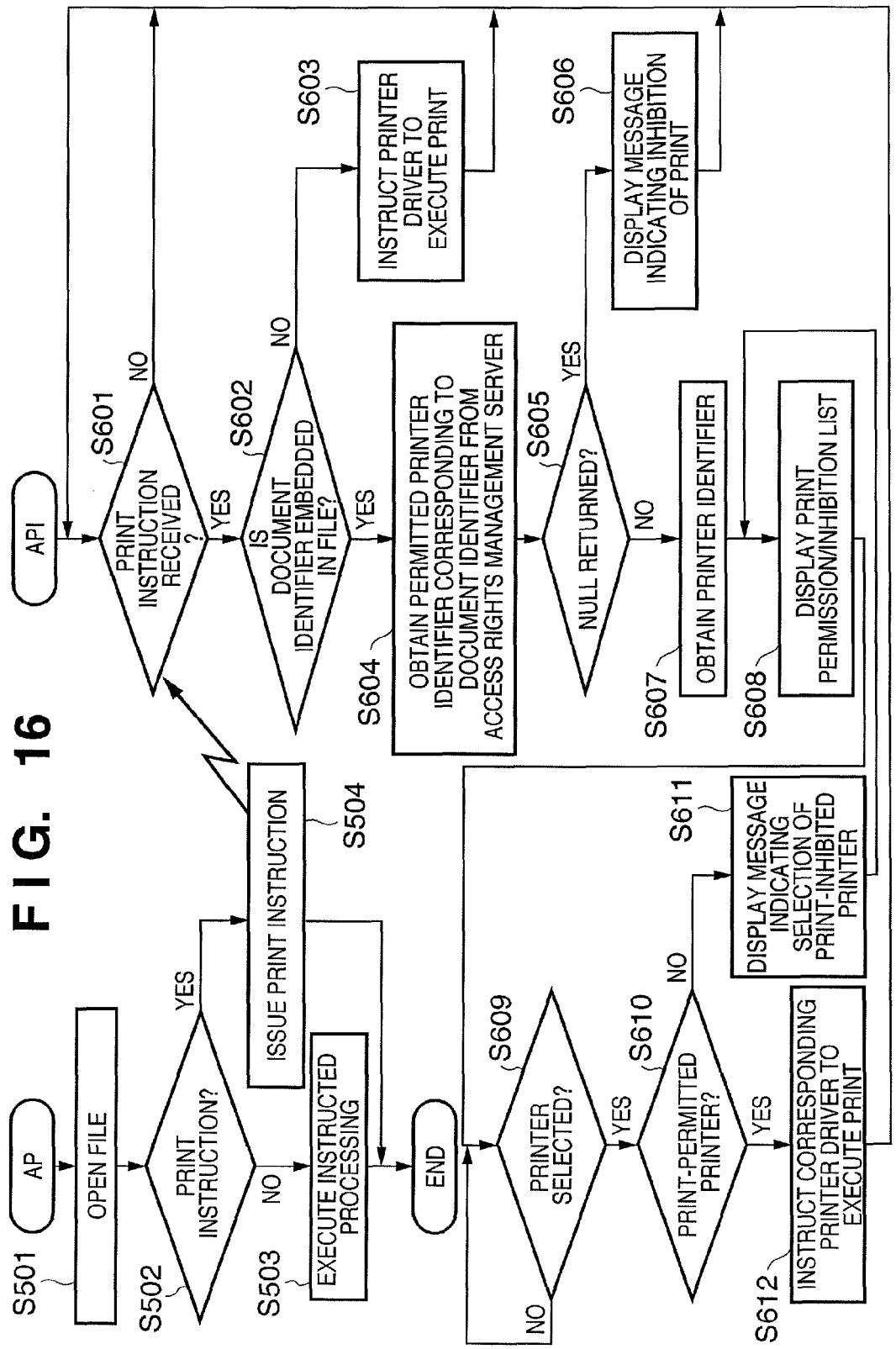
FIG. 16 is a flowchart for explaining the operation of a client.

FIG. 16 is a flowchart for explaining the operation of the client (information processing apparatus 101).

The AP 31 opens the file 32 designated by the user (S501), and checks if the user issues a print instruction (S502). If the user instructs to execute processing other than print processing such as movement, enlarge/reduction display, edit (if it is permitted), and the like of pages, the AP 31 executes the instructed processing (S503), and terminates the process. If the user instructs to print the file 32 (or its part), the AP 31 issues a print instruction to the API 37 (S504), and terminates the process.

Upon reception of the print instruction (S601), the API 37 checks if a document identifier is embedded in the file 32 (S602). If a document identifier is not embedded, the API 37 determines that the file 32 does not undergo access rights control, and passes data (or its part) of the file 32 to a printer driver corresponding to a default printer device or that designated by the user to request it to prepare print data (S603). The process then returns to step S601.

If the document identifier is embedded, the API 37 accesses the access rights management server 106 to obtain a permitted printer identifier set in correspondence with that document identifier (S604). Note that details of the obtaining method will be described later.

The API 37 checks if the access rights management server 106 returns "NULL" (S605). If the server 106 returns "NULL", the API 37 determines that print processing of the file 32 is not permitted, and displays a message indicating that print processing is inhibited (FIG. 8) on the monitor 10 (S606). Then, the process returns to step S601 without executing print processing.

If the API 37 receives the permitted printer identifier in place of "NULL", it obtains the printer identifier corresponding to the printer driver already installed in the information processing apparatus 101 from the HD 13 (S607). Then, the API 37 displays, on the monitor 10, a list (FIG. 9) indicating the relationship between available printer devices and permission/inhibition of print processing based on the relationship between the permitted printer identifier and the printer identifier (S608). That is, the API 37 presents to the user printer devices that can print the file and prompts the user to select a printer device. Note that the API 37 permits print processing using a printer device whose printer identifier matches the permitted printer identifier, and inhibits print processing using a printer device whose printer identifier does not match the permitted printer identifier. If the permitted printer identifier is "NULL", the API 37 inhibits print processing using all the printer devices.

If the user selects a printer device (S609), the API 37 checks if the user selects a print-permitted printer device (S610). If the user selects a print-inhibited printer device, the API 37 displays a message shown in FIG. 10 (S611), and the process returns to step S608.

If the user selects the print-permitted printer device, the API 37 passes data (or its part) of the file 32 to the printer driver corresponding to the printer device of interest, and requests it to prepare print data (S612). The process then returns to step S601.

In response to the request from the API 37, the printer driver prepares print data, and transmits a print job including that print data to the target printer device, thus making that printer device execute print processing.

Obtain Permitted Printer Identifier

Figure 17:
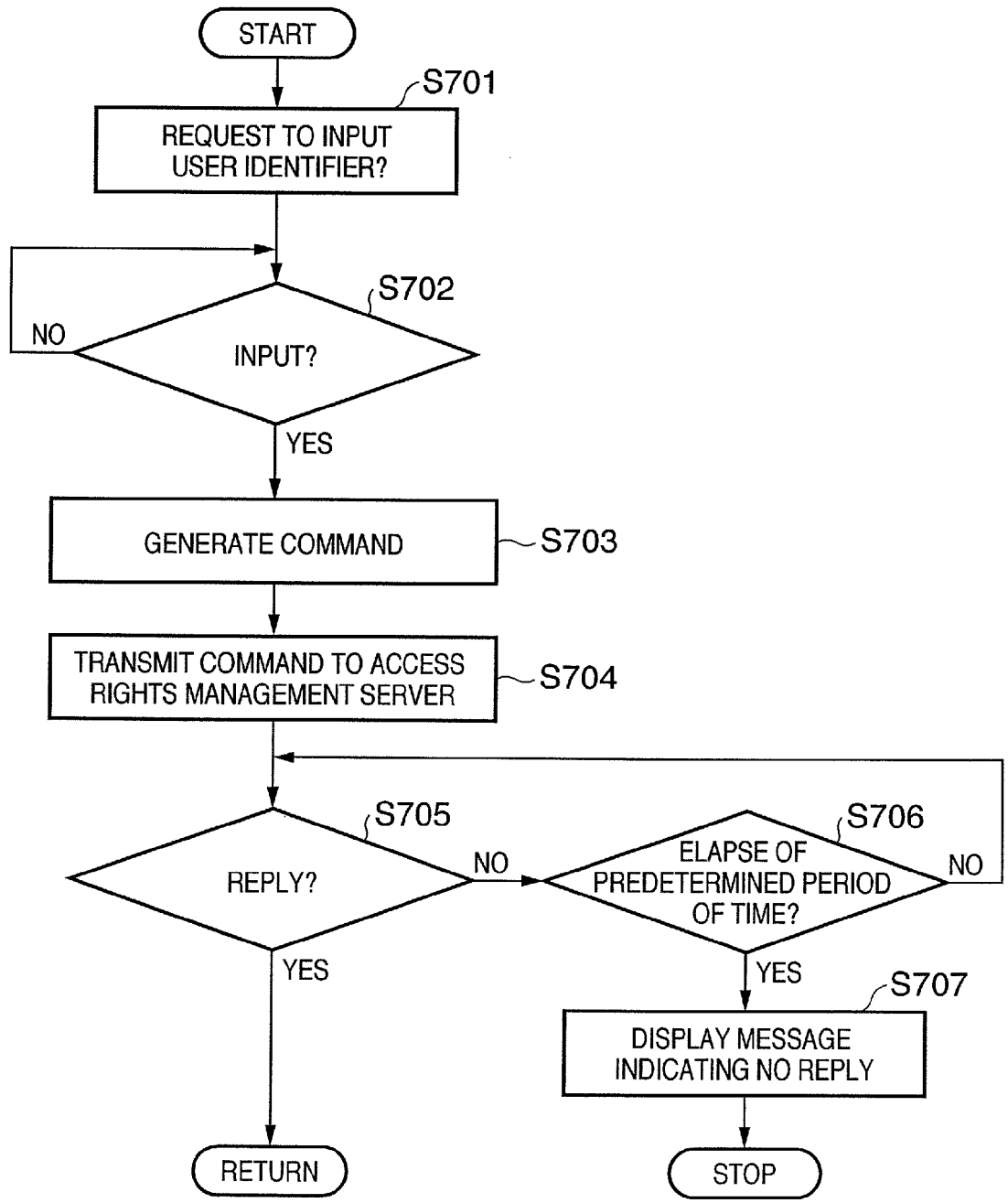
FIG. 17 is a flowchart showing the obtaining sequence of a print-permitted printer identifier.

FIG. 17 is a flowchart showing the obtaining sequence of a permitted printer identifier.

The API 37 displays a message that requests the user to input the user identifier required to access the access rights management server 106 on the monitor 10 (S701), and waits for input of the user identifier (S702). Upon input of the user identifier, the API 37 generates a command in which the input user identifier is set in the user identifier field, an obtaining request of the permitted printer identifier is set in the request identifier field, the document identifier of the file 32 is set in the document identifier field, and the command length is set (S703). The API 37 transmits the generated command to the access rights management server 106 (S704), and checks a reply from the access rights management server 106 (S705). If no reply is received, the API 37 checks if a predetermined period of time has elapsed (S706). If no reply is received even after an elapse of the predetermined period of time, the API 37 displays a message that advices accordingly on the monitor 10 (S707), and aborts the processing. The process then returns to step S601. If a reply is received, the process returns to the processing in FIG. 16.

In this manner, permitted printer identifiers can be set and managed in correspondence with document identifiers. Therefore, the same effects as in the first embodiment can be expected. In addition, when a permitted printer identifier need be updated, it need not be updated for each file, and the permitted printer management table held by the access rights management server 106 need only be updated.

Other Embodiment

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-376671, filed Dec. 27, 2005, which is hereby incorporated by reference herein in its entirety.

What is claimed is:

1. A control method of an information processing apparatus, comprising:
using a processor to perform the steps of:
obtaining a permitted printer identifier embedded in a document file;
obtaining printer identifiers corresponding to printer drivers installed in the information processing apparatus from a memory of the information processing apparatus;
displaying, that a printer which corresponds to a printer identifier matching with the permitted printer identifier can print the document file, and another printer cannot print the document file, on a monitor so that a user selects a printer to print the document file;
instructing, in a first case that the printer which corresponds to the printer identifier matching with the permitted printer identifier is selected, a printer driver corresponding to the selected printer to generate a print job for the document file; and
displaying, in a second case that a printer corresponding to a printer identifier, which is not match with the permitted printer identifier, is selected, that the document file cannot be printed by the selected printer on the monitor,
the processor further performing the step of:
determining whether or not a document identifier is embedded in the document file;
obtaining, if the document identifier is embedded, the embedded document identifier, a printer identifier associated with the obtained document identifier from a server apparatus, and printer identifiers, which indicates available printers from the information processing apparatus, from the memory;
generating, if the document identifier is embedded, a list of printers which can print the document file referring a relationship between the printer identifier obtained from the server apparatus and the printer identifiers obtained from the memory;
inputting, if the document identifier is embedded, a user selection for a printer based on the list;
instructing, if the document identifier is embedded, a printer driver corresponding to a printer indicated by the user selection to generate a print job for the document file;
instructing, in a third case that no permitted printer identifier and no document identifier are embedded in the document file, a printer driver corresponding to a printer set as default to generated a print job for the document file;
generating, in a fourth case that no printer identifier associated with the obtained document identifier is obtained, a message indicating that the document file cannot be printed;
transmitting a request for a document identifier to the server apparatus; and
receiving a document identifier issued by the server apparatus in response to the request,
wherein the server apparatus registers the issued document identifier with a management table of the server apparatus.

2. An information processing apparatus comprising:
a first obtaining section, configured to obtain a permitted printer identifier embedded in a document file, and to obtain printer identifiers corresponding to printer drivers installed in the information processing apparatus from a memory;
a displaying section, configured to display that a printer which corresponds to a printer identifier matching with the permitted printer identifier can print the document file, and another printer cannot print the document file, on a monitor so that a user selects a printer to print the document file; and
a controlling section, configured to, in a first case that the printer which corresponds to the printer identifier matching with the permitted printer identifier is selected, instruct a printer driver corresponding to the selected printer to generate a print job for the document file,
wherein, in a second case that a printer corresponding to a printer identifier, which is not match with the permitted printer identifier, is selected, the displaying section displays that the document file cannot be printed by the selected printer on the monitor,
the information processing apparatus further comprising:
a determining section, configured to determine whether or not a document identifier is embedded in the document file;
a second obtaining section, configured to, if the document identifier is embedded, obtain the embedded document identifier, obtain a printer identifier associated with the obtained document identifier from a server apparatus, and obtain printer identifiers, which indicates available printers from the information processing apparatus, from the memory;
a generating section, configured to, if the document identifier is embedded, generate a list of printers which can print the document file referring a relationship between the printer identifier obtained from the server apparatus and the printer identifiers obtained from the memory; and
an inputting section, configured to, if the document identifier is embedded, input a user selection for a printer based on the list,
wherein, if the document identifier is embedded, the controlling section instructs a printer driver corresponding to a printer indicated by the user selection to generate a print job for the document file,
wherein, in a third case that no permitted printer identifier and no document identifier are embedded in the document file, the controlling section instructs a printer driver corresponding to a printer set as default to generated a print job for the document file, and in a fourth case that no printer identifier associated with the obtained document identifier is obtained, the second obtaining section generates a message indicating that the document file cannot be printed, the information processing apparatus further comprising:
a transmitting section, configured to transmit a request for a document identifier to the server apparatus; and
a receiving section, configured to receive a document identifier issued by the server apparatus in response to the request, wherein the server apparatus registers the issued document identifier with a management table of the server apparatus.

3. An information processing apparatus, comprising:
a determining section, configured to determine whether or not a document identifier is embedded in a document file;
an obtaining section, configured to, if the document identifier is embedded, obtain the embedded document identifier, obtain a printer identifier associated with the obtained document identifier from a server apparatus, and obtain printer identifiers, which indicates available printers from the information processing apparatus, from a memory;
a generating section, configured to, if the document identifier is embedded, generate a list of printers which can print the document file referring a relationship between the printer identifier obtained from the server apparatus and the printer identifiers obtained from the memory;
an inputting section, configured to, if the document identifier is embedded, input a user selection for a printer based on the list; and
a controlling section, configured to, if the document identifier is embedded, instruct a printer driver corresponding to a printer indicated by the user selection to generate a print job for the document file,
wherein, in a first case that no permitted printer identifier and no document identifier are embedded in the document file, the controlling section instructs a printer driver corresponding to a printer set as default to generated a print job for the document file, and in a second case that no printer identifier associated with the obtained document identifier is obtained, the second obtaining section generates a message indicating that the document file cannot be printed,
the information processing apparatus further comprising:
a transmitting section, configured to transmit a request for a document identifier to the server apparatus; and
a receiving section, configured to receive a document identifier issued by the server apparatus in response to the request,
wherein the server apparatus registers the issued document identifier with a management table of the server apparatus.

4. The apparatus according to claim 3, wherein the transmitting section transmits a request for addition of a permitted printer, the issued document identifier, and a printer identifier to the server apparatus so that the sever apparatus adds the printer identifier to a printer identifier field corresponding to the issued document identifier in the management table, and
wherein the transmitting section transmits a request for deletion of a permitted printer, the issued document identifier, and a printer identifier to the server apparatus so that the server apparatus deletes the printer identifier from a printer identifier field corresponding to the issued document identifier in the management table.

5. The apparatus according to claim 4, wherein the controlling section obtains a printer identifier held by a printer from the printer corresponding to a printer driver through the printer driver, and stores the obtained printer identifier to the memory.

6. A control method of an information processing apparatus comprising:
using a processor to perform the steps of:
determining whether or not a document identifier is embedded in a document file;
obtaining, if the document identifier is embedded, the embedded document identifier, a printer identifier associated with the obtained document identifier from a server apparatus, and printer identifiers, which indicates available printers from the information processing apparatus, from a memory;
generating, if the document identifier is embedded, a list of printers which can print the document file referring a relationship between the printer identifier obtained from the server apparatus and the printer identifiers obtained from the memory;
inputting, if the document identifier is embedded, a user selection for a printer based on the list;
instructing, if the document identifier is embedded, a printer driver corresponding to a printer indicated by the user selection to generate a print job for the document file;
instructing, in a first case that no permitted printer identifier and no document identifier are embedded in the document file, a printer driver corresponding to a printer set as default to generated a print job for the document file;
generating, in a second case that no printer identifier associated with the obtained document identifier is obtained, a message indicating that the document file cannot be printed;
transmitting a request for a document identifier to the server apparatus; and
receiving a document identifier issued by the server apparatus in response to the request,
wherein the server apparatus registers the issued document identifier with a management table of the server apparatus.

* * * * *